United States Patent
Lang

(10) Patent No.: US 9,460,456 B2
(45) Date of Patent: Oct. 4, 2016

(54) COMPUTATION THROUGH ARRAY DECOMPOSITION

(71) Applicant: Yahoo! Inc., Sunnyvale, CA (US)

(72) Inventor: Kevin J. Lang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 222 days.

(21) Appl. No.: 14/222,584

(22) Filed: Mar. 21, 2014

(65) Prior Publication Data

US 2015/0269122 A1 Sep. 24, 2015

(51) Int. Cl.
*G06F 17/16* (2006.01)
*G06Q 30/02* (2012.01)

(52) U.S. Cl.
CPC .................. *G06Q 30/0269* (2013.01)

(58) Field of Classification Search
None
See application file for complete search history.

(56) References Cited

U.S. PATENT DOCUMENTS 7,469,266 B2 * 12/2008 Gustavson .......... G06F 12/0875
708/520
7,792,895 B1 * 9/2010 Juffa ....................... G06F 17/16
708/607
8,364,739 B2 * 1/2013 Baskaran ................ G06F 17/16
706/12
8,577,949 B2 * 11/2013 DeLaquil ................ G06F 17/12
703/2
2011/0125819 A1 * 5/2011 Mazahreh ............... G06F 17/16
708/207
2015/0269122 A1 * 9/2015 Lang .................. G06Q 30/0269
708/607

OTHER PUBLICATIONS

Solomonik, et al, "Communication-optimal parallel 2.2D matrix multiplication and LU factorization algorithms," Technical Report No. UCB/EECS-2011-10, http://www.eecs.berkeley.edu/Pubs/TechRpts/2011/EECS-2011-10.html, Feb. 7, 2011, 28 pages.
Zadeh, et al, "Dimension Independent Similarity Computation," Journal of Machine Learning Research, 2012, 24 pages.

* cited by examiner

*Primary Examiner* — David H Malzahn
(74) *Attorney, Agent, or Firm* — Berkely Law & Technology Group, LLP

(57) ABSTRACT

Briefly, embodiments of methods and/or systems of computation via array decomposition are disclosed. For one embodiment, as an example, a system may be capable of implementation of an advertising audience overlap analysis dashboard in which for an audience exceeding 100 million users and exceeding 10,000 user groups. Such a system embodiment, for example, may be capable of computing an exact count of user overlap among the user groups in less than two hours.

20 Claims, 4 Drawing Sheets

100

105 {ID_00001, ID_00002, ID_00003, ID_00004, ID_00005, ..., ID_99999}

110 {
| | ID_00001 | ID_00002 | ID_00003 | ID_00004 | ID_00005 | ... | ID_99999 |
|---|---|---|---|---|---|---|---|
| G_00001 | 0 | 0 | 1 | 0 | 0 | ... | 0 |
| G_00002 | 1 | 0 | 0 | 0 | 0 | ... | 0 |
| G_00003 | 0 | 1 | 0 | 0 | 0 | ... | 0 |
| G_00004 | 0 | 0 | 0 | 1 | 0 | ... | 0 |
| G_00005 | 1 | 0 | 0 | 0 | 0 | ... | 0 |
| ⋮ | ⋮ | ⋮ | ⋮ | ⋮ | ⋮ | ⋱ | ⋮ |
| G_99999 | 0 | 1 | 0 | 0 | 0 | ... | 0 |

$i \longrightarrow$ $j \downarrow$

$i \longrightarrow$ $j \downarrow$

FIG. 1B

COMPUTATION THROUGH ARRAY DECOMPOSITION

BACKGROUND

1. Field

The present disclosure relates generally to computing (e.g., counting), which may employ array decomposition to improve efficiency, for example

2. Information

Media networks and/or advertisers may occasionally have an interest in targeted marketing of network users. Targeted marketing may enable advertisers, for example, to present relevant materials to users, thereby reducing likelihood that a user will view an advertisement as irrelevant and/or inappropriate "spam," for example. Thus, targeted marketing may be of benefit to users by at least reducing, or even in some cases eliminating, advertisements for which a user may have little interest. In addition, targeted marketing may be of benefit to advertisers by, for example, reaching those individuals expected to be more likely to purchase, for example, an advertised product and/or service.

Media networks and/or advertisers may compile parameters for users, which may permit categorization of users into one or more groups. Groups, also referred to as groupings, may enable a media network to better target marketing and/or advertising materials for example. In some instances, however, media networks and/or advertisers may compile hundreds, thousands, or an even larger number of parameters to group users. Thus, at least in some instances, managing large and/or ever-growing lists, which may comprise, for example, billions of users categorized according into tens of thousands or even hundreds of thousands of groups, for example, may represent a formidable computing challenge.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

FIGS. 1A and 1B are schematic illustrations of various arrays according to an embodiment;

Figure 2:
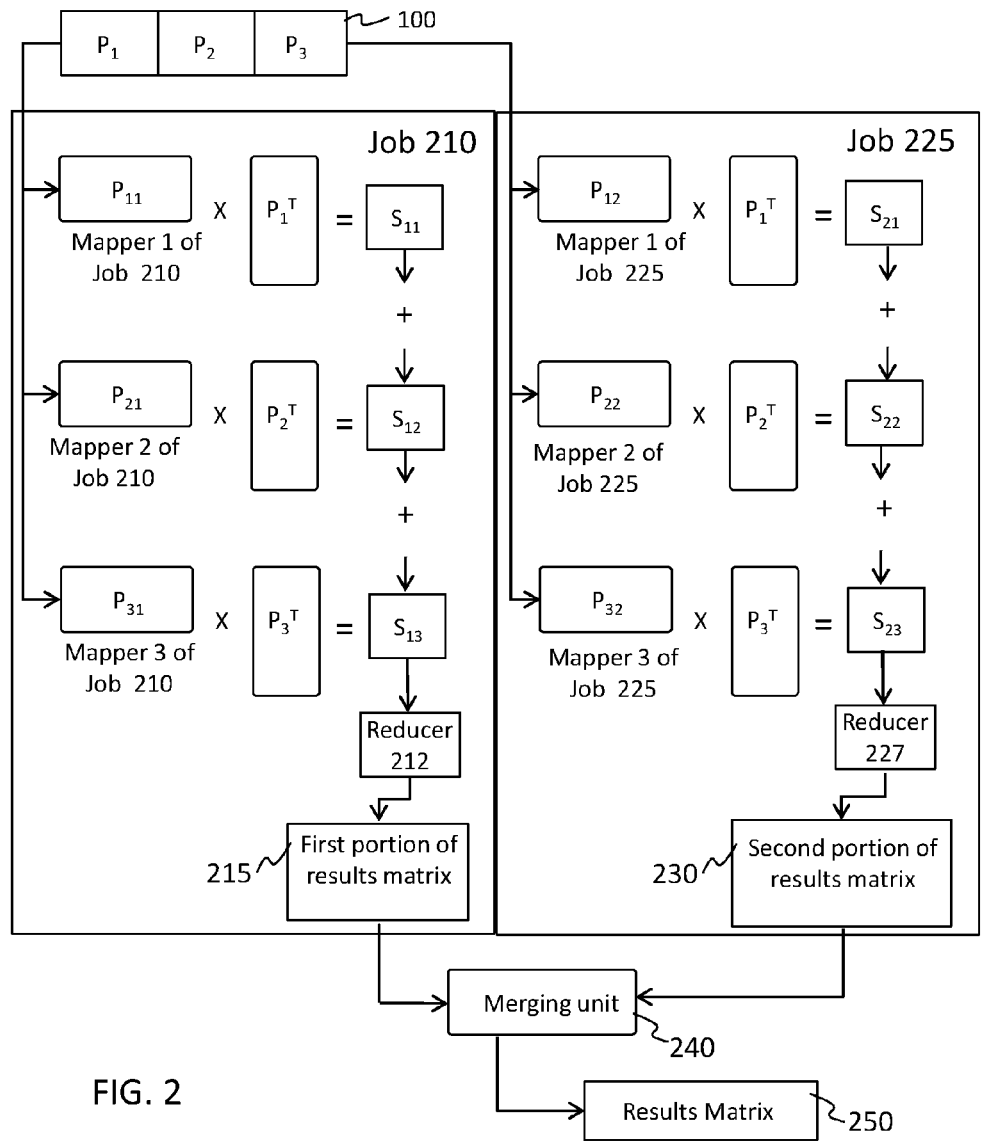
FIG. 2 is a schematic diagram illustrating decomposition of an array for computation according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to "one implementation," "an implementation," "one embodiment," "an embodiment" and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals or states capable of, for example, being stored, transferred, combined, processed, compared, and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

In this context, the terms "coupled," "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. In this context, the term "between" and/or similar terms are understood to include "among" if appropriate for the particular usage. Likewise, in this context, the terms "compatible with," "comply with" and/or similar terms are understood to include substantial compliance or substantial compatibility. Though it should be noted that these are merely illustrative examples and claimed subject matter is not limited to this example.

The terms "network device" may refer to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform, and/or similar terms are used interchangeably. While in some instances, for ease of description, these terms may be used in the singular, such as by referring to a "client device," "client computing device," or a "server device," the description is intended to encompass one or more client devices, or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. A network may be very large, such as comprising thousands of nodes, millions of nodes, billions of nodes, or more, as examples.

Certain media networks, such as the Yahoo!™ network, for example, may be increasingly seeking ways to attract users to their networks and/or to retain users within their networks for extended periods of time. Media networks may, for example, comprise an Internet website or group of websites having one or more sections. For instance, the Yahoo!™ network includes websites located within different categorized sections, such as sports, finance, current events, games, matters of local interest, to name just a few non-limiting examples among a variety of possible examples.

To attract and/or retain users within its network, Yahoo!™ and/or other media networks may desire to provide content relating to categorized and/or localized sections that may be interesting, relevant, and/or of use. To further attract and/or retain users within its network, Yahoo!™ and/or other media networks may likewise desire to provide advertisements and/or marketing materials that may be expected to be of at least potential interest. Thus, media networks, such as Yahoo!™, may compile and/or otherwise obtain parameters, such as demographics, for example, that may be employed to group users and, thus, may also be employed to appropriately target advertising materials to users. Providing relevant content, as well as relevant advertising materials, may permit a media network to increase its user base, which may allow the media network to become more valuable to potential advertisers, for example. Thus, advertisers may be inclined to pay more money and/or provide other considerations to a media network in return for advertising, for example, via that media network, its partners, and/or its subsidiaries. In this context, the terms "content" and/or "advertising materials" may include, as examples, images, video, audio, text, and/or multimedia, such as in the form of stored physical (e.g., memory) states and/or in the form of electronic signals, for example.

As a way of illustration, "client device" and/or similar terms in this context refers to a "client computing device" and/or a "client network device" and, therefore, may include, for example, a smart phone, a personal digital assistant, a wearable computer, a wrist phone, a laptop computer, a personal entertainment system, a tablet personal computer, a personal audio and/or video device, a personal navigation device, as well as other types of client computing and/or network devices, including any combinations thereof. Furthermore, these are intended merely as illustrative examples of client devices; claimed subject matter is not meant to be limited to illustrative examples. It is also noted that terms, such as "operation," "function," and/or similar terms may be used interchangeably in this context.

As the term may be used herein, a client device may receive, store, and/or transmit one or more user "identifiers," as well as identifiers corresponding to entities other than users, for example. For example, an identifier, such as a user identifier, may be transmitted to a media network, for example. In this context, a user identifier, for example, may comprise any physical signals, such as electronic transmissions, and/or physical states, such as memory states, that may be employed to identify a particular user and/or an account of a particular user, for example. Any given user identifier, or other type of identifier, may not necessarily be unique by itself; however, the term user identifier, or simply "identifier," in this context may include several identifiers that if taken together may be employed to uniquely designate a particular user and/or a particular user account, such as, for example, in connection with an Internet service, as an example. It should be noted that identifiers may pertain to entities other than users, such as locations, households, geographic areas, groups of individuals, and claimed subject matter is not limited in this respect. Thus, although in example embodiments discussed herein user identifiers are employed, identifiers are not limited to identifying users.

In particular embodiments, again, as non-limiting illustrative examples, an identifier may comprise a cookie and/or other set of parameters, such as, may, for example, be transmitted by a server to a browser and which may be returned by the browser as a result of subsequent server access, for example. In particular embodiments, a cookie may be used to identify a network user, for example, and/or track a network user's access to a server. It should be noted, however, that a cookie represents but one of any number of possible approaches toward identifying users of a network and/or other entities and claimed subject matter is not limited to any particular approach.

As the term is used herein, a "grouping," "group," and/or similar terms may refer to a category of, for example, users, such as network users, for example. Users may also be referred to as individuals and/or similar terms in this context. In particular embodiments, users may be grouped in a variety of ways that may include demographics, preferences, and/or other attributes that may be associated with a user, such, for example, according to age groups, such as 18-29-year-olds, 29-35-year-olds, and so forth. As another example, users may be grouped according to, for example, country of origin, such as United States, Canada, Mexico, and/or may be grouped according to other geographical parameters, such as state, province, ZIP code, region, and so forth. Example of groups or groupings that may relate to preferences may, for example, include users who may express and/or otherwise indicate a preference for certain types of movies and/or particular movie titles, certain types of automobiles and/or particular models of automobiles etc. Groups or groupings of users may also relate to, as examples, income levels, education levels, etc. Thus, any attribute that may be employed to group users is intended to be included. Illustrative examples, again, include demographics, preferences, behaviors, etc.; however, claimed subject matter is not limited to examples provided as illustrations, as others may be known to those of skill in the art.

As previously discussed, media networks may obtain demographic and/or other parameters corresponding to users. Likewise, as discussed, a user may be identified by way of an identifier, such as one or more cookies and/or other identifiers. In some instances, a media network may be large enough so as to be accessed by millions, tens of millions, hundreds of millions, or even billions of users. Additionally, a media network may categorize or classify users (e.g., identifiers that may represent users), according to various groups, which, as previously discussed, may represent user demographics, user preferences, and/or any other attribute of one or more users. Accordingly, media networks may desire to utilize and/or exploit knowledge of user preferences in a manner that may be of benefit to advertisers, the media network, and/or users themselves.

In particular, it is not uncommon for advertisers and/or other media related entities to have a desire for measuring overlap among various groups of user categories. For example, it may be meaningful in terms of measuring reach with respect to content, including advertisements. It may also be meaningful as a technique to reduce redundancy of content, including advertisements, which may be annoying to some users, for example, since typically more than one group of users may be targets with respect to content. For example, it may be desirable for a system to implement an advertising audience overlap analysis dashboard in which user group overlap may be computed and potentially even displayed for large numbers of users and for large numbers of user groups.

Thus, in one example of an embodiment, a media network may generate an array, such as a multi-dimensional array, which may be used to categorize users. As one example of an embodiment, a two dimensional array may comprise a matrix, for example. In one instance, for example, a media network may develop a matrix in which columns of the matrix may comprise separate users (e.g., separate user identifiers), and in which rows of the matrix may comprise separate groups of users (e.g., categories). It is noted, in this context, that a multi-dimensional array, such as a matrix, may comprise a set of memory locations. For the case of a matrix, two indices may be employed to refer to positions within the array. For a three-dimensional array, three indices may be employed, etc. However, particular physical memory locations associated with the array for a given device may otherwise be "transparent." That is, physical memory locations may not necessarily be sequential or aligned in a particular fashion so long as the device is able to read from and/or write to array positions via use of indices, such as $A_{i,j}$, for example, where i refers to an index that may take on values 1 to M, M being a positive integer, and where j refers to an index that may take on values from 1 to N, N also being a positive integer, as an example for a matrix.

Continuing with an example embodiment, for example, a "1" or a "0" may be located in a designated row, column position, e.g., $A_{i,j}$, with j representing a particular user and i representing a particular group (e.g., category) of users. A "1" may indicate, for example, that user j is a member of group i. In a simple example, such as shown below, with user identifiers across the top horizontally, and groups running down the left side vertically, user identifier "12345" may be represented as being a member of an 18-29-year-old demographic by way of placement of a "1" in a corresponding row, and by way of placement of a "0" in other rows. User "56789," on the other hand, may be identified as being a member of a group comprising 30-35-year-olds by way of placement of a 1 in a corresponding row, and placement of an "0" in other rows. Of course, other useful conventions may likewise be employed in alternative embodiments. Nonetheless, continuing with this example, for convenience, users may be indexed by j and groups may be indexed by i, as previously described. Likewise, it is, of course, appreciated that in an embodiment, rows may designate separate users and columns may designate separate groups of users.

|               | 12345 | 56789 | ... |
|---------------|-------|-------|-----|
| 18-29 years old | 1     | 0     | ... |
| 30-35 years old | 0     | 1     | ... |
| ...           | ...   | ...   | ... |

However, assuming for this example that columns comprise users and rows comprise groups of users, in some instances, a matrix may comprise a virtually unlimited number of columns, such as numbering into the millions, billions, tens of billions, without limitation. Additionally, a matrix may comprise a virtually unlimited number of rows, such as numbering into the tens of thousands, hundreds of thousands, and so forth.

While in an embodiment, an array, including as an example, a matrix, such as described above, may be employed in a process to assess overlap among groups of users, in some instances the size of an array may be unusually large. As a non-limiting example, a matrix may comprise, for example, approximately 1 billion columns, and approximately 50,000 rows, for example. Although arrays as previously described, for example, may be employed to do meaningful processing; likewise, arrays may be so large that memory of a given device, such as a computing device and/or a network device, for example, may be exceeded, even if a sparse representation is used for the matrix or array. For situations in which large arrays are employed, it may be desirable to decompose the array by columns and rows so that decomposed portions may be processed separately. Thus, in an embodiment, a matrix may be processed in a decomposed manner that respects memory limits of computing and/or network devices and in a manner that consumes marginal computing times, as described in more detail in an example embodiment below. In this context, a matrix may be decomposed so that non-overlapping subsets of the matrix may be processed in a distributed fashion that also exploits locality of a given device, for example.

Although claimed subject matter is not limited in scope in this respect, a MapReduce-type architecture, such as employed by a Hadoop distributed computing system, may be employed. In an example embodiment, as mentioned, a matrix is illustrated; however, claimed subject matter is not so limited. Thus, a multi-dimensional array of more than two dimensions may be employed in some instances.

In a particular embodiment, using a matrix example embodiment, an overall computation to be performed comprises multiplying a matrix with its transpose. For example, if B represents a matrix of size M by N, where M and N are large integers, then a computation $B \times B^T$ may be performed, where a superscript T denotes transpose. Likewise, a resulting matrix of a computation comprises a square, symmetric matrix of size M by M, in this example. Entries in a given position of $B \times B^T$ result in a "count" of user overlap between groups of users. For example, an entry in a location (x, y) of $B \times B^T$ provides a count of the number of users that are in group row x and also in group row y. However, as previously described, M and N may be sufficiently large so that it may be desirable for B to be decomposed for separate computation by separate devices of particular sets of rows and columns, in this example. An example of decomposition for an embodiment is described in more detail below.

In some embodiments, as indicated previously, computations may take place within a framework of a distributed computing environment, such as Hadoop or MapReduce, in which parts of a input matrix may assigned to one or more "mappers" of computing "jobs," for example. In this context, the terms "parts", "parts file", "part matrices", "part arrays" and/or similar terms refers to a non-overlapping division of an array, such as a matrix. For example, parts of an input matrix may refer to a matrix divided in accordance with column ranges, such as part 1 comprising columns 1 to x, part 2 comprising columns x+1 to y, and part 3 comprising columns y+1 to z, so that in combination, the entire input matrix is appropriately represented, assuming the input matrix has columns 1 to z. Furthermore, in connection with any particular computing job, a plurality of mappers, such as 5 mappers, 10 mappers, 50 mappers, or even hundreds, or thousands of mappers may perform computing operations. Parts, or part files, of an input matrix, as an example, may be accessed by mappers, for example, which may operate as components of a computing job so as to generate a slice of a results matrix. A "slice" refers to division of an upper triangular portion of a results matrix by rows, such as every other row, or every third row for example. In a simple example, a first slice may comprise even rows and a second slice may comprise odd rows. Thus, mappers of a first job, for example, may produce a results slice that corresponds to respective parts of an input matrix in which the results slice is computed in response to the first job. A first results slice, for example, may be generated by a first mapper of a computing job. In this example, a first slice may comprise odd rows of a results matrix. It is noted that the disjoint corresponding portions of parts matrices that result in a particular slice through processing are referred to as sliced parts of an input matrix. Likewise, mappers of a second job, for example, may produce a second results slice that corresponds to respective parts of an input matrix. A second results slice may be generated by a second compute job. In this example, a second slice may comprise even rows of an output matrix. Disjoint portions of a results matrix, e.g., slices, may be merged with one another so as to give rise to a results matrix in this example.

In some embodiments, therefore, as suggested, improvements in processing "locality" may be realized. For example, in typical MapReduce processing scenarios, an input matrix file may be partitioned into dozens, hundreds, or even thousands of part files. Part files (and/or sliced parts files) may then be transmitted across a network to various processing nodes, such as nodes comprising mappers or other processing devices. Processing nodes may, in turn, perform computations, such as computation of a transpose of a part of an input matrix, computation of a product of a sliced part and a transpose of a part file (e.g., unsliced), and combination of the products formed to generate respective slices of a results matrix. Slice portions of a results matrix from processing nodes may then be merged to form a results matrix.

Figures 1A, 1B:
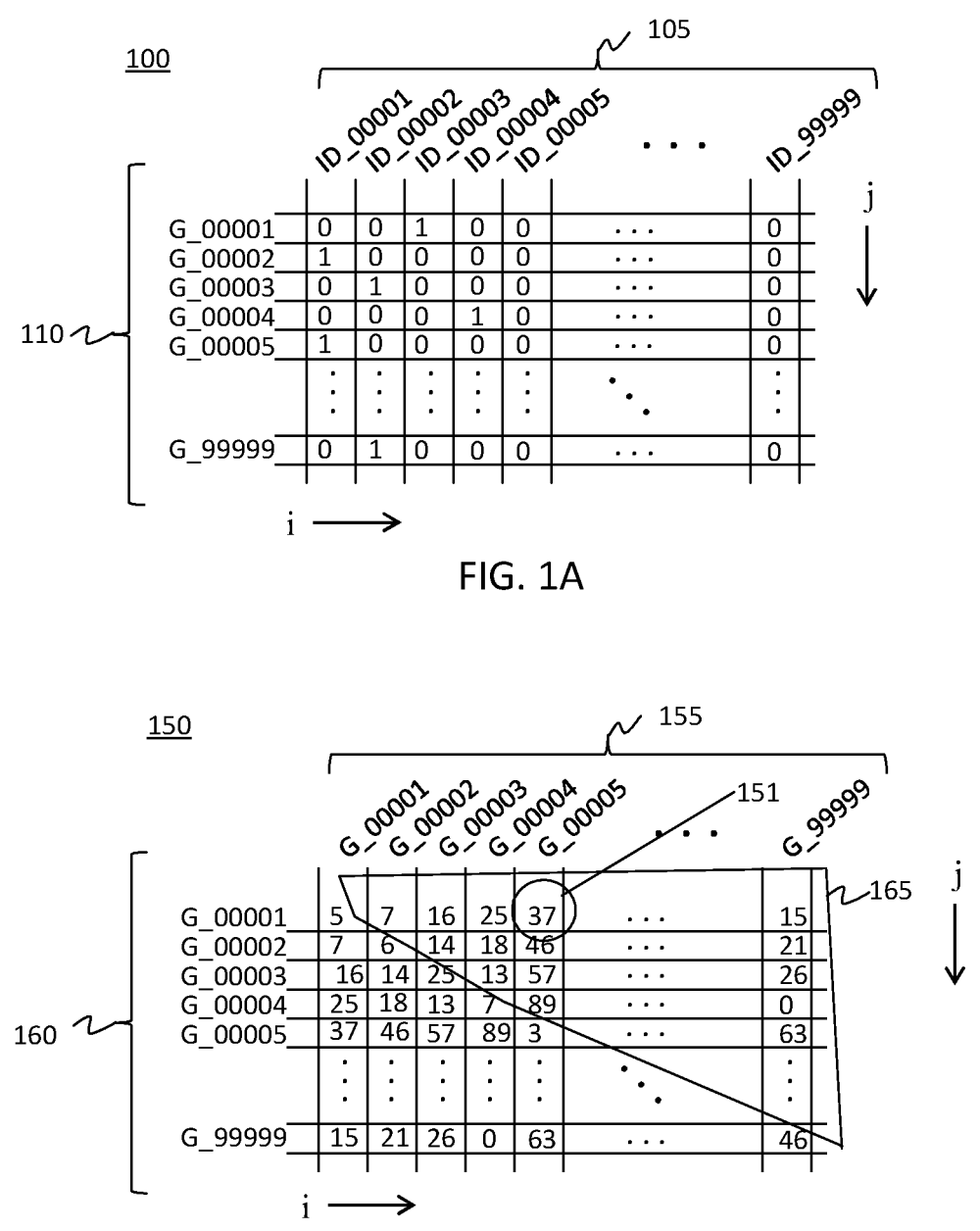

FIG. 1A is a schematic illustration of a matrix 100 according to an embodiment. In FIG. 1A, matrix 100 may comprise columns 105 and may also comprise rows 110, for example. In certain embodiments, matrix 100 may represent a sparse matrix, in which many cells of matrix 100 comprise a "0" to indicate that identifiers 105 are not members of groups represented by rows 110. For example, in an embodiment, one or more of columns 110 may represent one of five age groups (e.g., G_00001, G_00002, G_00003, G_00004, and G_00005). Accordingly, for example, in view of a user represented by identifier ID_00001 being a member of one age group at any one time, just one of cells G_00001-G_00005 corresponding to identifier ID_00001 would comprise "1," with remaining cells comprising a "0." However, for other groups, of course, depending at least in part on the particular groups and the particular user, in an embodiment, a column may have several cells containing a "1."

In embodiments, matrix 100 may comprise a large number of columns, such as more than approximately 1.0 billion, for example, and a large number of rows, such as approximately 50,000, or more, for example. However, in other embodiments, matrices of differing sizes may be used, such as matrices comprising fewer columns, such as approximately 1.0 million, approximately 10.0 million, and so forth, or a greater number of columns, such as approximately 10.0 billion, and so forth. Likewise, embodiments may involve matrices comprising, for example, approximately 1000 rows, approximately 5000 rows, approximately 100,000 rows, etc. Claimed subject matter is intended to embrace processing of arrays of virtually any size, without limitation.

FIG. 1B is a schematic illustration of a results matrix 150 which may be generated by multiplying matrix 100 by its transpose according to an embodiment. Matrix 150 may be characterized as a square matrix comprising an equal number of columns and rows. In the example of FIG. 1B, matrix 150 comprise columns G_00001 through G_99999 and rows G_00001 through G_99999. In embodiments, cells of matrix 150 comprise a count of identifiers having particular groups in common (e.g., overlapping), as previously described. Thus, in one possible example, if a group represented by G_00001 represents 18-25-year-olds, and a group represented by G_00005 represents, for example, motorcycle riders, cell 151 (e.g., i=G_00001, j=G_00005) may indicate that 37 identifiers are common to both groups (e.g., there are 37 18-25-year-olds that are also motorcycle riders).

Matrix 150 of FIG. 1B may be additionally characterized as a symmetrical matrix in which, for example, cell $a_{i,j}=a_{j,i}$. Further, a diagonal of matrix 150, which may comprise those cells (e.g., $a_{i,j}$) for which i=j, may represent inconsequential and/or uninteresting counts of groups, such as, for example, groups that overlap with themselves. In one possible example, just to illustrate, if cell G_00005 represents 18-25-year-olds, then i=G_00005, j=G_00005 may represent 18-25-year-olds who are also 18-25-year-olds. Accordingly, at least in some embodiments, meaningful or consequential parameters of matrix 150 may comprise a triangular region, such as upper region 165, for example. Alternatively, as a result of symmetry, a lower triangular region may be employed, of course. It should be noted that matrix 150 may possess additional features. Thus, claimed subject matter is not limited to the illustrative features described.

FIG. 2 is a schematic diagram 200 showing computation of a results matrix in which a matrix comprising columns representing users (e.g., user identifiers) and rows representing groups of users, such as matrix 100, has been divided into part matrices according to an embodiment. In FIG. 2, matrix 100 of FIG. 1A, for example, may be divided into three part matrices, $P_1$, $P_2$, and $P_3$, which may be assigned to a corresponding number of mappers, such as mappers operating within a Hadoop computing framework, as an example. In the example of FIG. 2, $P_1$, $P_2$, and $P_3$ may represent approximately ⅓ of matrix 100. Thus, $P_1$ may comprise, for example, rows 1-50,000 of matrix 100 and columns 1 through approximately 333 million. $P_2$ may comprise, for example, rows 1-50,000 of matrix 100 and columns 333 million (approximately) to 666 million (approximately). $P_3$ may comprise, for example, rows 1-50,000 of matrix 100 and columns 666 million (approximately) to 1.0 billion (approximately). However, three part matrices, $P_1$, $P_2$, and $P_3$ may likewise be apportioned into sliced parts, $P_{11}$, $P_{21}$, and $P_{31}$, and $P_{12}$, $P_{22}$, and $P_{32}$.

Of course, in general, decomposition typically will involve many more parts and/or slices; however, for ease of discussion, an example is discussed involving three parts and two slices. Likewise, as discussed in more detail below, a variety of considerations may affect apportionment of a matrix, for example, into parts and/or sliced parts for processing.

In FIG. 2, job 210 and job 225 may represent computing operations in an embodiment in which a matrix comprising columns, such as representing users, and comprising rows, such as representing groups of users (e.g., matrix 100), may be read by one or more computing devices. Furthermore, at least a portion of a slice of a results matrix may be computed and merged with additional computed slices, and a results matrix may be written to memory, for example.

In the example of FIG. 2, job 210 and job 225 may generate slices of a results matrix comprising complementary rows of a results matrix. In this example, one slice may comprise odd rows and another slice may comprise even rows. In one possible example, job 210 may generate odd rows of a results matrix, and job 225 may generate even rows of a results matrix. It should be noted, however, that particular embodiments may involve other potential allocations of computing tasks among computing jobs, and claimed subject matter is not limited in this respect. For example, a results matrix may be computed responsive to allocating computing operations among four computing jobs operating within a Hadoop computing framework. In one example, which may involve allocating operations among four computing jobs, a first computing job may comprise computing rows 1, 5, 9, etc. of a results matrix, a second computing job may comprise computing rows 2, 6, 10, etc. of a results matrix, a third computing job may comprise computing rows 3, 7, 11, etc. of a results matrix, and a fourth computing job may comprise a-computing rows 4, 8, 12, etc. of a results matrix. Again, as with odd and even rows, this example is simplified for purposes of convenient illustration.

However, as shown in FIG. 2, to compute odd-numbered rows of a results matrix, mapper 1 of job 210 may compute a transpose of a part file (e.g., unsliced, such as $P_1$), which may be expressed as $P_1^T$. $S_{11}$, which may comprise odd rows of a portion of a results matrix, may be formed responsive to multiplying, for example, $P_{11}$ by $P_1^T$ utilizing mapper 1 of job 210. Likewise, $S_{12}$, which may also comprise odd-numbered rows of a results matrix, may be formed responsive to multiplying, utilizing mapper 2 of job 210, $P_{21}$ by a transpose of $P_2$ (e.g., $P_2^T$). Likewise, $S_{13}$ may be formed responsive to multiplying, utilizing mapper 3 of job 210, $P_{31}$ by a transpose of $P_3$ (e.g. $P_3^T$). $S_{11}$, $S_{12}$, and $S_{13}$, at least in the example of FIG. 2 may be subsequently reduced into a first portion of results matrix 215 by reducer 212 to form a first slice of a results matrix, in this example.

To compute even-numbered rows of a results matrix, e.g., a second slice, mapper 1 of job 225 may compute a transpose of $P_1$, which may be expressed as $P_1^T$, for example. $S_{21}$, which may comprise even rows of a portion of a results matrix, may be formed by multiplying, for example, $P_{12}$ by $P_1^T$ utilizing mapper 1 of job 225, for example. Likewise, $S_{22}$, which may also comprise even-numbered rows of a results matrix, may be formed by multiplying, utilizing mapper 2 of job 225, $P_{22}$ by a transpose of $P_2$ (e.g., $P_2^T$). Likewise, $S_{13}$ may be formed by multiplying, utilizing mapper 3 of job 225, $P_{32}$ by a transpose of $P_3$ (e.g. $P_3^T$). $S_{21}$, $S_{22}$, and $S_{23}$ may be subsequently reduced into second portion of results matrix 230 by reducer 227 to form a second slice of a results matrix in this example.

After computing first portion of results matrix 215, e.g., first slice, and second portion of results matrix 230, e.g., second slice, a merging unit, such as 240, may generate results matrix 250. In particular embodiments, 240 may interleave rows, here, for example, odd and even rows, of portions of a results matrix. In other embodiments, in which, for example, four computing jobs may be used to compute every fourth row of a results matrix, unit 240 may function to interleave rows into a results matrix. Unit 240 may, of course, perform additional functions. Thus, claimed subject matter is not limited to an illustrative example, such as this simplified illustration.

Figure 3:
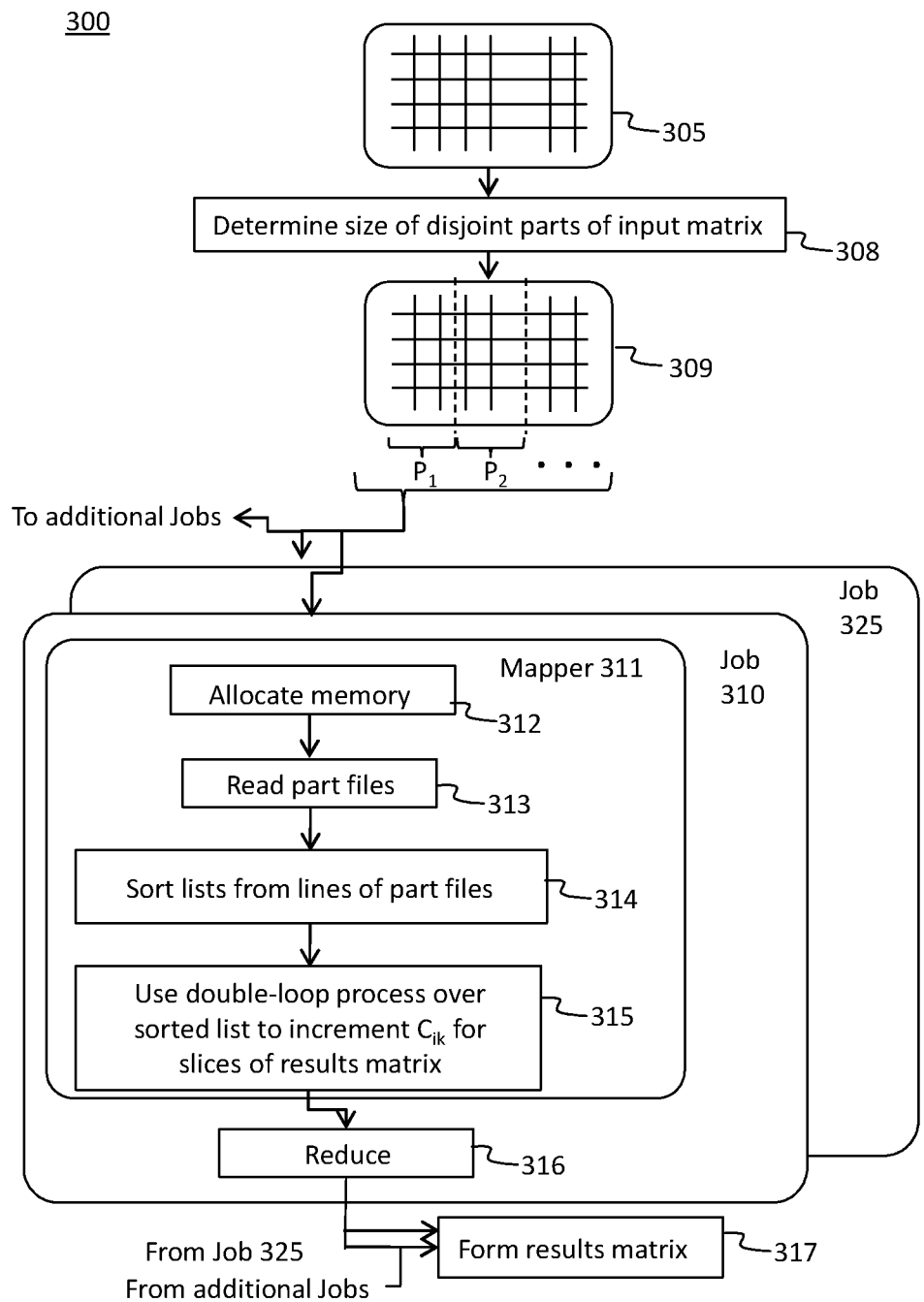
FIG. 3 is a schematic diagram showing results matrix computation operations resulting from an input matrix according to an embodiment.

FIG. 3 is a schematic diagram 300 showing results matrix computation operations for an input matrix according to an embodiment. FIG. 3 may begin by accessing, for example, a memory that stores input matrix 305. At 308, disjoint parts of an input matrix may be determined based, at least in part, on determining memory limits of a computing device and/or networking device. A variety of approaches are possible since a variety of tradeoffs exist, such as a tradeoff between reduction in time for a computation and an increase in use of computational resources. One approach is described below, although claimed subject matter is not limited to a particular approach.

In particular embodiments, however, a device, such as a computing device and/or network device, may perform one or more mapping functions which may comprise a component of a computing job. In the example of FIG. 3, input matrix 305 may be divided, for example, into at least two disjoint part matrices illustrated by 309 (e.g., $P_1$, $P_2$, etc.). However, as indicated, an input matrix may be divided, for example, into any number of disjoint parts.

Within a particular processing job, which may operate within a distributed computing framework, for example, such as job 310, a number of mappers, such as mapper 311 may perform computing operations. Accordingly, job 310 may comprise dozens of mappers, such as mapper 311 or any other number of mappers which may operate in parallel, for example. At block 312, which may operate within mapper 311, for example, a computing device and/or network device may allocate sufficient memory for matrix manipulation operations to be performed. Matrix manipulation operations may comprise, for example, multiplication of one or more parts of an input matrix, for example. At block 313, a mapper, such as a Hadoop mapper, for example, may read part files of an input matrix, which may be used for a particular mapper, for example. At block 314, mapper 311 may sort lists each obtained by reading one line of a part file which specifies, for example, row IDs of non-zero values in a particular column. In embodiments, block 314 may be advantageous if part files involve sparse matrices comprising mostly zeroes. Block 314 may, at least in some embodiments, facilitate more economical (e.g., more efficient) computation of an upper triangular portion of a results matrix, for example. At block 315, a double-loop process may be performed over each sorted list L obtained by way of block 314. The double loop may consider in turn each pair (i, k) of row IDs in the sorted list L that identifies a cell in the upper triangular portion of the slice of the results matrix that has been assigned to mapper 311. For each such pair (i, k), the count $C_{ik}$ in the identified cell is incremented. Assuming that the results matrix has been divided into S slices, and that mapper 311 has been assigned to compute slice number s, the outer loop of the double loop may skip over row ID's i in L for which it is not true that (i MOD S)=s. To avoid doing work that does not pertain to the upper triangular portion of the results matrix, the inner loop of the double loop may skip over row ID's k for which it is not true that (i<k). In an embodiment, for example, a combined effect of a double-loop process over sorted per-column row ID lists, in which an outer loop skips over non-slice row IDs, aggregated over the columns of a part file, may comprise, in effect, executing computation of a matrix product such as $P_{11}$ multiplied by the transpose of $P_1$. At block 316, an output from mapper 311 and outputs of other mappers besides 311 that belong to the same job 310 may be reduced into a first slice of a results matrix. The method may conclude at block 317, which may comprise forming a results matrix from one or more of jobs 310, job 325, and/or any additional computing jobs, for example.

In certain embodiments, matrix 150, shown in FIG. 1, for example, may be computed in a relatively economical and/or time-efficient manner. As previously indicated, a variety of considerations may impact computation of results matrix 150. Although claimed subject matter is not limited in this respect, one approach to computing P, the number of parts, and S, the number of slices, for a given matrix, for example, shall be illustrated with an embodiment. For example, if matrix 100 of FIG. 1A represents a sparse matrix, let the variable $L_j$ represent a number of ones (1s) in the Jth column of matrix 100. For purposes of estimating the intrinsic cost of the various portions of the overall computation (e.g. reading, calculating, and writing) according to a possible and simplified computational model, temporarily assume that a sequential method is being run on a single computing device. Then an intrinsic cost (Q) of the calculations needed to generate a results matrix 150 from an input matrix comprising N columns, such as input matrix 100, may be proportional to expression 1, below:

$$Q = \sum_{j=1}^{N} \binom{|L_j|}{2} \tag{1}$$

Wherein the term $$\binom{|L_j|}{2}$$

indicates a binomial coefficient and where Q is, therefore, is a sum over binomial coefficients.

In certain embodiments, reading a large input matrix, such as matrix 100, may also contribute to use of computational resources (e.g., cost). Thus, again, assuming a single computing device to perform sequential operations and letting the variable $L_j$ represent the number of ones in the Jth column of matrix 100, an intrinsic cost (R) to read an input matrix comprising N columns, such as matrix 100, may be proportional to expression 2, below:

$$R = \Sigma_{j=1}^{N} |L_j| \tag{2}$$

As it pertains to writing a results matrix, such as writing results matrix 150 to a memory storage device, it may assumed for a moment that results matrix 150 represents a "dense" matrix (as opposed to a sparse matrix). Thus, again, employing a single computing device, an intrinsic cost (W) to write the upper triangular portion of the dense matrix comprising G rows and G columns may be proportional to expression 3 below:

$$W = \binom{M}{2} \tag{3}$$

Wherein the term $$\binom{M}{2}$$

indicates a binomial coefficient.

Thus, by way of summing expressions 1, 2, and 3, cost may be proportional to a cost factor of expression 4, below, for example, for a single computing device performing sequential operations:

$$\text{Cost}_{(Intrinsic)} \approx Q + R + W \tag{4}$$

Accordingly, since a single computing device is employed, a time consumed may be proportional to a similar factor:

$$\text{Time}_{(Sequential)} \approx Q + R + W \tag{5}$$

However, the total time of expression 5 (e.g., R+Q+W) that would elapse while a sequential process respectively reads the input matrix 100, computes the result matrix 150, and writes output matrix 150, may approach and/or exceed an allocated time period. In some instances, even if state-of-the-art computing devices are used, a time period consumed in obtaining a results matrix may exceed, for example, approximately 100.0 hours. Accordingly, it may be beneficial to generate results matrix 150 using one or more parallel processing approaches, as suggested previously. In embodiments, parallel processing approaches may reduce time consumed in reading an input matrix, computing a results matrix, and/or writing a computed results matrix to one or more memory storage devices. It should be noted that parallel processing approaches may bring about other advantages, and claimed subject matter is not limited in this respect. However, parallel processing may likewise result in an adjustment of cost factors.

Accordingly, in particular embodiments, a matrix may be divided into a number of "part files" (P) and assigned to mappers, such as mappers within a Hadoop computing framework, for example. Assignments to mappers, such as mappers within a Hadoop computing framework, may be arranged in a manner so as to generate slices (S) of a results matrix, such as results matrix 150. Thus, expression 1, which may be used to estimate computational expense (Q), may be divided among a number of mappers. Accordingly, at least in some embodiments, division among a number of mappers may not necessarily proportionally increase computational cost, such as shown in expression 6, below:

$$Q_{(TotalForMappers)} = Q_{(Intrinsic)} = Q \tag{6}$$

However, at least in some embodiments, dividing the output into an increased number of results slices, such as "S" slices, may proportionally increase the total cost associated with mappers reading an input matrix, such as matrix 100. In embodiments, of course, increases in proportional cost associated with reading a matrix may be weighed against decreases in proportional time to compute a results matrix. A proportional cost increase for reading an input matrix, such as matrix 100, may be summarized in expression 7, below:

$$R_{(TotalForMappers)} = S \cdot R_{(Intrinsic)} = S \cdot R \tag{7}$$

Additionally, in at least some embodiments, dividing the input into an increased number of input parts, such as "P" parts, may proportionally increase the total cost associated with mappers writing intermediate versions of an output matrix, such as matrix 150. In embodiments, of course, increases in proportional cost associated with writing a matrix may be weighed against decreases in proportional time to compute a results matrix. A proportional cost increase for writing intermediate versions of an output matrix, such as matrix 150, may be summarized in expression 8 below:

$$W_{(TotalForMappers)} = P \cdot W_{(Intrinsic)} = P \cdot W \tag{8}$$

In embodiments, results files of mappers may be further processed so as to reduce divided portions of results matrices (e.g., slices) into a results matrix, such as results matrix 150. In some embodiments, a reducer cost may be proportional to expression 9, below:

$$R_{(TotalForReducers)} = P \cdot W \qquad (9)$$

Further, a cost to write a dense matrix comprising G rows and G columns may be proportional to expression 10, below:

$$W_{(TotalForReducers)} = W \qquad (10)$$

Thus, a proportional total cost factor may be summarized in expression 11, below:

$$ParallelCost_{(S,P)} \approx (Q+SR+PW)+(PW+W) \qquad (11)$$

In particular embodiments, the time elapsed during the execution of the mappers can be estimated by dividing the mappers' share (Q+SR+PW) of the total cost by the number of mappers PS. Similarly, the time elapsed during the execution of the reducers can be estimated by dividing the reducers' share (PW+W) by the number of reducers S. Hence the time elapsed while using the parallel method to compute a results matrix comprising M columns and M rows, may be proportional to expression 15, below:

$$ParallelTime_{(S,P)} \approx \frac{Q}{P \cdot S} + \frac{R}{P} + \frac{(P+2) \cdot W}{S} \qquad (15)$$

Accordingly, it may be seen from expression 15 that time consumed to generate a results matrix comprising M rows and M columns using P·S mappers and S reducers may be at least approximately proportionately decreased. In particular embodiments, a value of S may be chosen that brings about a W/S that may be accommodated in a single computing device. Likewise, in some embodiments, a value of P may be chosen that brings about a time expression, such as ParallelTime$_{(S,P)}$ of expression 15, which may be less than a chosen limit, such as for consumers (e.g. media networks and/or advertisers). In one possible embodiment, a matrix comprising, for example, approximately 1 billion columns, for example, and approximately 50,000 rows, may be processed in a manner that respects memory limits of computing devices in a MapReduce distributed architecture, for example, to reduce computation time from approximately 100.0 hours to approximately 30.0 min.

Figure 4:
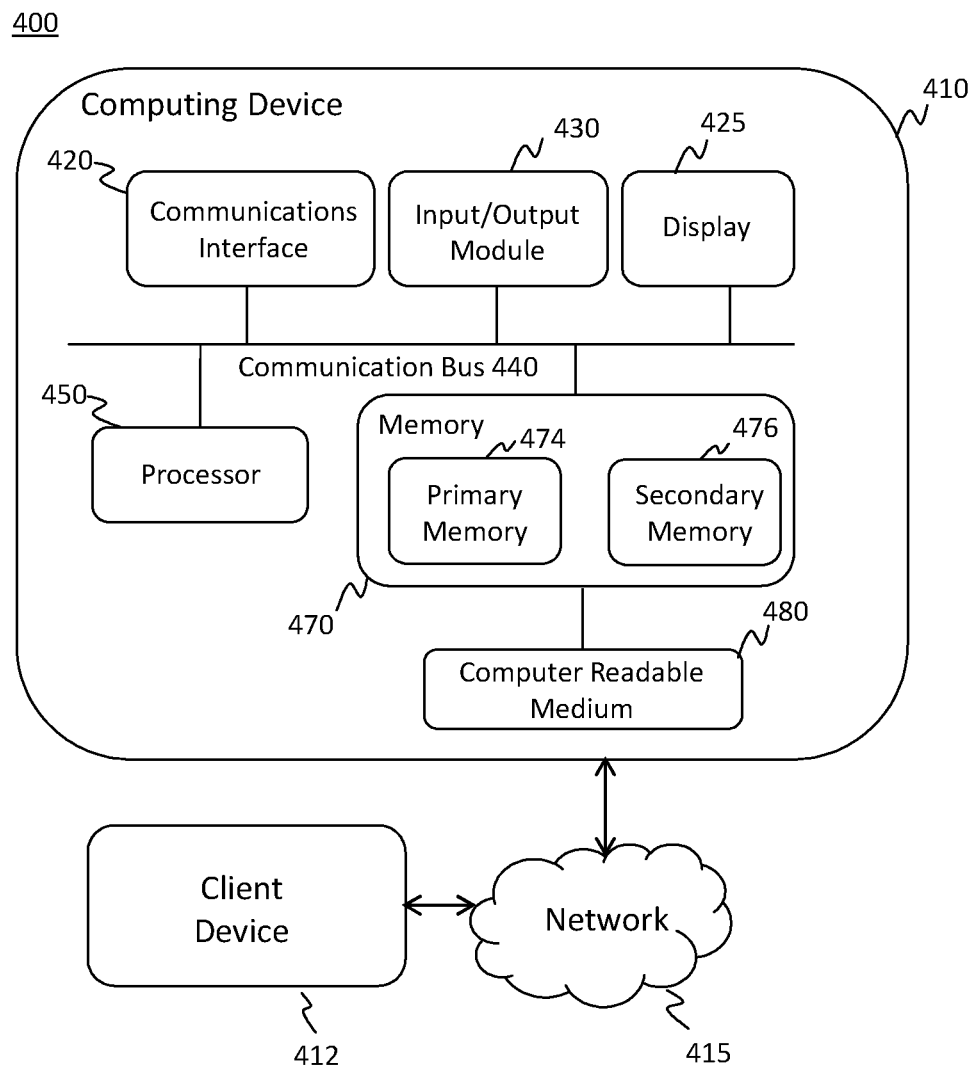
FIG. 4 is a schematic diagram of a computing platform that may be employed in connection with array decomposition according to an embodiment.

For purposes of illustration, FIG. 4 is a schematic diagram 400 of a computing platform that may be employed for determining identifiers common to identifier groups according to an embodiment. A computing platform, such as that embodied in FIG. 4 may comprise computing device 410 that may be employed to perform operations such as, for example, described herein. In FIG. 4, computing device 410 may represent a computing device capable of operating within a Hadoop and/or similar MapReduce computing framework. Computing device 410 may interface with client device 412, which may comprise features of a cellular telephone, a smart phone, a personal digital assistant, a wearable computer, a wrist phone, a laptop computer, a personal entertainment system, a tablet personal computer, a personal audio and/or video device, a personal navigation device, as well as other type of client device, for example.

Communications interface 420, processor 450, and memory 470, which may comprise primary memory 474 and secondary memory 476, may communicate by way of communication bus 440, for example. In FIG. 4, computing device 410 may store various forms of computer-implementable instructions, by way of input/output module 430, for example, such as those that may be operative, for example, to read a matrix comprising columns representing user identifiers and rows representing user groups and compute a results matrix. Client device 412 may communicate with computing device 410 by way of a wired and/or wireless Internet connection via network 415, for example. Although a computing platform, such as the computing platform embodied in FIG. 4 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 450 may be representative of one or more circuits, such as digital circuits, to perform at least a portion of a computing procedure or process. By way of example but not limitation, processor 450 may comprise one or more processors, such as controllers, microprocessors, microcontrollers, application specific integrated circuits, digital signal processors, programmable logic devices, field programmable gate arrays, and the like, or any combination thereof. In implementations, processor 450 may perform signal processing to manipulate signals and/or states or to construct signals and/or states, for example.

Memory 470 may be representative of any storage mechanism. Memory 470 may comprise, for example, primary memory 474 and secondary memory 476, additional memory circuits, mechanisms, or combinations thereof may be used. Memory 470 may comprise, for example, random access memory, read only memory, or one or more data storage devices or systems, such as, for example, a disk drive, an optical disc drive, a tape drive, a solid-state memory drive, just to name a few examples. Memory 470 may be utilized to store a program, as an example. Memory 470 may also comprise a memory controller for accessing computer-readable medium 480, which may read part files, compute transpose matrices representative of part files, and generate slices of a results matrix. Under direction of processor 450, memory, such as cells storing physical states, representing, for example, a program, may be executed by processor 450 and generated signals may be transmitted via the Internet, for example. Processor 450 may also receive digitally encoded signals from computing device 410.

Network 415 may comprise one or more communication links, processes, and/or resources to support exchanging communication signals between a client computing device and server, which may, for example, comprise one or more servers (not shown). By way of example, but not limitation, network 415 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing device 410, as depicted in FIG. 4, is merely one such example, and claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may also comprise a computer-readable medium that may carry and/or make accessible content, code and/or instructions, for example, executable by processor 450 or some other controller or processor capable of executing instructions, for example. A user may make use of an input device and/or an output device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers.

In other embodiments, a communication network may be embodied as a wired network, wireless network, or combination thereof.

A computing or network device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be, at least in part, in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. A method of distributed computation of a decomposed multi-dimensional array over a set of special-purpose computing devices, without further human interaction, in which the set of special-purpose computing devices includes a set of processors and a set of memory devices, comprising:
   accessing computer instructions from the set of memory devices of the set of special-purpose computing devices for execution on the set of processors of the set of special-purpose computing devices;
   executing the accessed computer instructions on the set of processors of the set of special-purpose computing devices; and storing, in the set of memory devices of the set of special-purpose computing devices, any results of having executed the accessed computer instructions on the set of processors of the set of special-purpose computing devices, wherein
the computer instructions to be executed comprise instructions for multiplying
disjoint sliced parts of the array with a transpose of a corresponding part of the array to produce disjoint sliced part products, and wherein
the executing the computer instructions further comprises: combining corresponding disjoint sliced part products on separate computing devices of the set of the set of special-purpose computing devices to generate a plurality of slices, and
electronically merging the generated slices to form a results array.

2. The method of claim 1, wherein the multi-dimensional array comprises a two-dimensional matrix and the results array comprises a results matrix.

3. The method of claim 2, further comprising:
determining size of one or more parts of the two-dimensional matrix based, at least in part, on a memory size of computing devices of the set of special-purpose computing devices.

4. The method of claim 3, further comprising, prior to the multiplying:
dividing the two-dimensional matrix into disjoint parts to be processed by one or more mapper operations, wherein the computing devices of the set of special-purpose computing devices comprise mappers.

5. The method of claim 2, further comprising:
determining a number of slices based, at least in part, on a tradeoff of reduction in computation time against an increase in computational resources.

6. The method of claim 2, wherein one dimension of the two-dimensional matrix corresponds to separate users and another dimension of the two-dimensional matrix corresponds to separate groups of users.

7. The method of claim 6, wherein an entry of the results matrix comprises a count of user overlap between two groups of users of the separate groups of users.

8. The method of claim 2, wherein the two-dimensional matrix comprises a sparse matrix.

9. A system comprising:
a distributed set of special-purpose computing devices, the distributed set of special-purpose computing devices including a set of processors and a set of memory devices; the distributed set of special-purpose computing devices to execute computer instructions on the set of processors without further human intervention, the computer instructions to be executed having been accessed from the set of memory devices for execution on the set of processors, the set of distributed special-purpose computing devices to store in the set of memory devices any results to be generated from the execution of the computer instructions on the set of processors;
the computer instructions to be executed comprising instructions for execution of array decomposition, wherein
the computer instructions to be executed are further to comprise instructions to multiply disjoint sliced parts of an array with a transpose of a corresponding part of the array to produce disjoint sliced part products, wherein the computer instructions to be executed are further to comprise instructions to:
combine corresponding products of disjoint sliced parts on computing devices of the set of special-purpose computing devices to generate a plurality of slices, and
electronically merge the slices to form a results matrix.

10. The system of claim 9, wherein the distributed set of special-purpose computing devices comprises a set of MapReduce devices having a distributed computing architecture.

11. The system of claim 10, wherein the array is to comprise two-dimensional array, the two-dimensional array to comprise a sparse matrix.

12. The system of claim 9, wherein one dimension of the array corresponds to separate users and another dimension of the array corresponds to separate groups of users.

13. The system of claim 12, wherein an entry of the results matrix to comprise a count of user overlap between two separate groups of users.

14. The system of claim 12, wherein the system is further capable of implementation of an audience overlap analysis dashboard in which for an audience exceeding 100 million users and exceeding 10,000 user groups, the system is capable of computing an exact count of user overlap among the user groups in less than two hours.

15. An article comprising:
a non-transitory storage medium having stored thereon instructions executable by at least one special-purpose computing device, the at least one special-purpose computing device comprising at least one processor and at least one memory, to:
execute computer instructions on the at least one processor, without further human intervention, the computer instructions to be executed having been accessed from the at least one memory for execution on the at least one processor and the at least one special-purpose computing device to store in the at least one memory of the at least one special-purpose computing device any results to be generated from the execution on the at least one processor of the computer instructions to be executed,
the computer instructions to be executed comprising instructions for execution to store binary digital signal quantities to result, at least in part, from the execution of the at least one processor of the special-purpose computing device,
the computer instructions to be executed comprising instructions for execution to merge a plurality of slices to form a results matrix, the plurality of slices formed responsive to combining multiplication products of disjoint sliced parts of an input matrix with a transpose of a corresponding part of the input matrix.

16. The article of claim 15, wherein the instructions are further executable to:
determine a size of the sliced parts of the input matrix.

17. The article of claim 15, wherein the instructions are further executable to:
divide the input matrix into the one or more sliced parts.

18. The article of claim 15, wherein the instructions are further executable to:
divide the input matrix into the sliced parts so that the sliced parts are disjoint.

19. The article of claim 15, wherein one dimension of the input matrix to correspond to separate groups of users.

20. The article of claim 19, wherein another dimension of the input matrix to correspond to separate users.

* * * * *